US011024860B2

(12) United States Patent
Riley et al.

(10) Patent No.: US 11,024,860 B2
(45) Date of Patent: Jun. 1, 2021

(54) FUEL CELL SYSTEM FOR A VEHICLE

(71) Applicant: Ford Motor Company, Dearborn, MI (US)

(72) Inventors: Matthew Riley, Ann Arbor, MI (US); Craig Mathie, White Lake Township, MI (US); Milos Milacic, New Boston, MI (US)

(73) Assignee: FORD MOTOR COMPANY, Dearborn, MI (US)

( * ) Notice: Subject to any disclaimer, the term of this patent is extended or adjusted under 35 U.S.C. 154(b) by 297 days.

(21) Appl. No.: 15/868,393

(22) Filed: Jan. 11, 2018

(65) Prior Publication Data

US 2019/0214662 A1 Jul. 11, 2019

(51) Int. Cl.
*H01M 8/04223* (2016.01)
*H01M 8/04228* (2016.01)
*H01M 8/04303* (2016.01)
*H01M 8/04746* (2016.01)
*H01M 8/24* (2016.01)
*H01M 8/04029* (2016.01)
*H01M 8/0432* (2016.01)

(52) U.S. Cl.
CPC ... *H01M 8/04253* (2013.01); *H01M 8/04029* (2013.01); *H01M 8/0432* (2013.01); *H01M 8/04228* (2016.02); *H01M 8/04231* (2013.01); *H01M 8/04303* (2016.02); *H01M 8/04358* (2013.01); *H01M 8/04768* (2013.01); *H01M 8/24* (2013.01); *H01M 2250/20* (2013.01)

(58) Field of Classification Search
CPC ......... H01M 8/04253; H01M 8/04029; H01M 8/0432; H01M 8/04358; H01M 8/04228; H01M 8/04303; H01M 8/04231; H01M 8/04768; H01M 8/24; H01M 8/04723; H01M 2250/20
See application file for complete search history.

(56) References Cited

U.S. PATENT DOCUMENTS

| | | | |
|---|---|---|---|
| 6,887,598 B2 | 5/2005 | Thompson et al. | |
| 7,976,999 B2 | 7/2011 | Fujita et al. | |
| 8,518,586 B2 | 8/2013 | Perry | |
| 9,005,830 B2 | 4/2015 | Goebel et al. | |
| 2005/0189156 A1* | 9/2005 | Osborne | H01M 8/04253 429/413 |
| 2005/0260463 A1* | 11/2005 | Chapman | H01M 8/04179 429/432 |
| 2007/0298289 A1* | 12/2007 | Clingerman | H01M 8/0432 429/429 |
| 2009/0208796 A1* | 8/2009 | Matsuo | H01M 8/04029 429/429 |
| 2017/0069920 A1* | 3/2017 | Sakakibara | H01M 8/04074 |

* cited by examiner

*Primary Examiner* — Ula C Ruddock
*Assistant Examiner* — Matthew W Van Oudenaren
(74) *Attorney, Agent, or Firm* — David B. Kelley; Brooks Kushman P.C.

(57) ABSTRACT

A fuel cell system and a method of controlling the fuel cell system is provided. A fuel cell generates power, and a coolant system provides coolant flow through the stack. A controller is configured to, in response to at least one of an ambient temperature and a coolant temperature being below a threshold value after a vehicle shut down command or event, command the coolant system to circulate coolant through the stack to reduce ice formation in the stack prior to commanding a purge of the fuel cell stack.

11 Claims, 4 Drawing Sheets

FUEL CELL SYSTEM FOR A VEHICLE

TECHNICAL FIELD

Various embodiments relate to a fuel cell system for a vehicle and a method for preparing the fuel cell system for freezing ambient conditions.

BACKGROUND

It is known that a number of fuel cells may be joined together to form a fuel cell stack. Such a stack generally provides electrical current in response to electrochemically converting hydrogen and oxygen into water. The electrical current generated in such a process is used to drive various devices in a vehicle or other such apparatus. A supply generally provides hydrogen or another fuel to the fuel cell stack. During fuel cell operation, byproducts such as product water and nitrogen, and unconsumed hydrogen may form, for example, at the anode side of a fuel cell stack. Liquid water, such as droplets, or water vapor may condense and need to be removed to prevent water blockages within fuel cell stack flow field channels.

For a fuel cell application in a vehicle, the fuel cell may be required to operate and be stored in freezing ambient temperatures. The vehicle and fuel cell may be exposed to temperatures of −25 Celsius or even lower, well below the freezing point for water. Cold weather operating issues need to be addressed for a fuel cell vehicle to operate in climates with extreme ambient temperatures, and to meet user expectations for the vehicle. When the vehicle and fuel cell is off and exposed to freezing conditions, any liquid water found within the fuel cell system may freeze, forming ice blockages that may prevent reactant or byproduct flow and result in delayed or unsuccessful fuel cell system start-up or a reduction in operating performance.

SUMMARY

In an embodiment, a fuel cell system is provided with a fuel cell stack to generate power, and a coolant system configured to provide coolant flow through the stack. A controller is provided and is configured to, in response to a signal indicative of an ambient temperature being below a threshold value after a vehicle shut down command, command the coolant system to circulate coolant through the stack prior to commanding a purge of the fuel cell stack.

In another embodiment, a method of controlling a vehicle fuel cell system is provided. In response to at least one of an ambient temperature and a coolant temperature being below a threshold value after a vehicle shut down event, a pump in a coolant system is operated while coolant in a fuel cell stack has a non-uniform temperature to circulate coolant through the stack and reduce ice formation in the stack prior to purging the fuel cell stack with gases.

DETAILED DESCRIPTION

As required, detailed embodiments of the present disclosure are provided herein; however, it is to be understood that the disclosed embodiments are merely examples and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure. Description of constituents in chemical terms refers to the constituents at the time of addition to any combination specified in the description, and does not necessarily preclude chemical interactions among constituents of the mixture once mixed.

It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), non-volatile random-access memory (NVRAM), or other suitable variants thereof) and software which co-act with one another to perform operation(s) disclosed herein. In addition, any one or more of the electrical devices as disclosed herein may be configured to execute a computer-program that is embodied in a non-transitory computer readable medium that is programmed to perform any number of the functions as disclosed herein.

Figure 1:
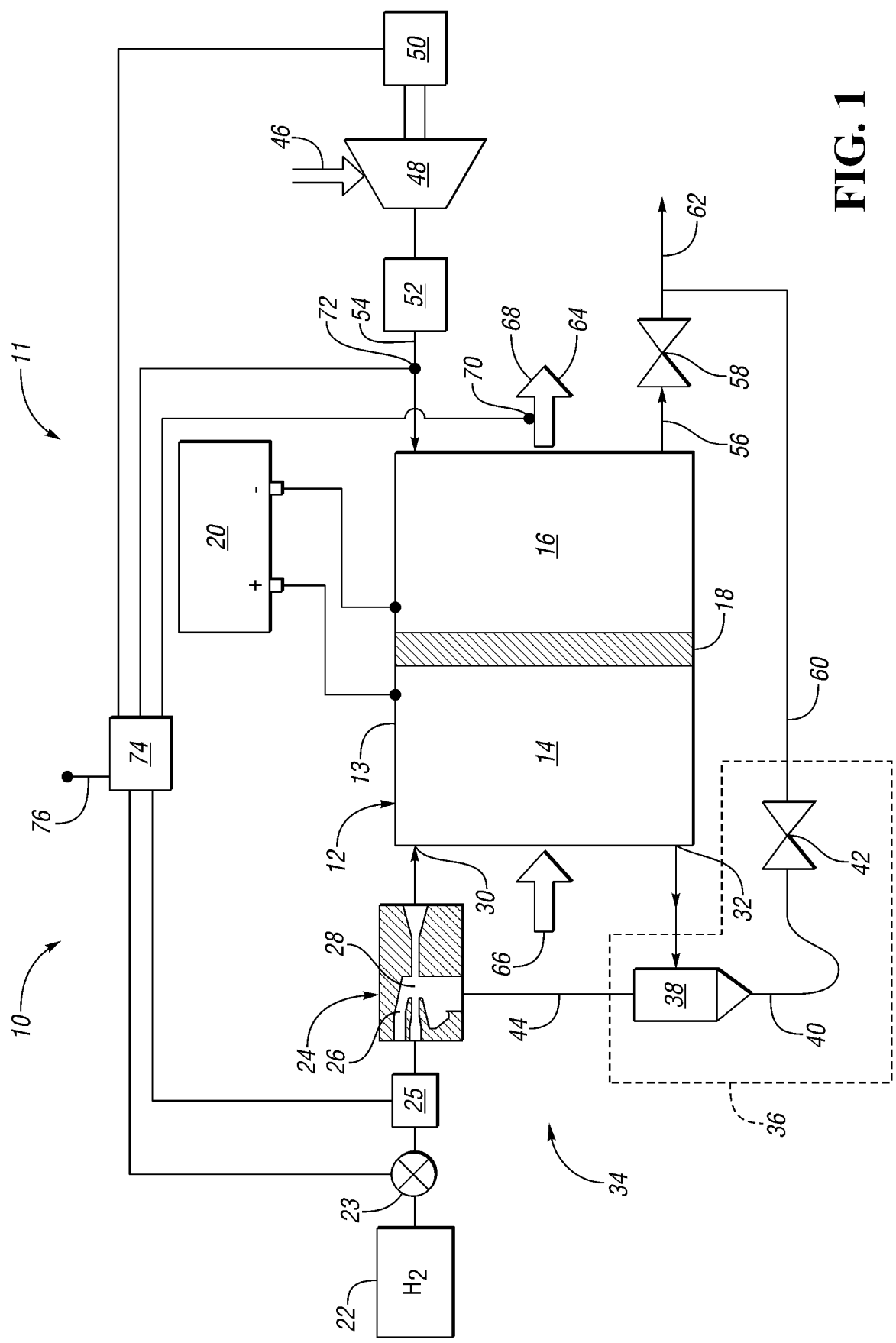
FIG. 1 illustrates a schematic of a fuel cell system in a vehicle according to an embodiment.

FIG. 1 schematically illustrates a fuel cell system 10 as a process flow diagram according to at least one embodiment. For example, fuel cell system 10 may be used in a vehicle 11 to provide electrical power to operate an electric motor to propel the vehicle or perform other vehicle functions. The fuel cell system 10 may be a proton exchange membrane fuel cell (PEMFC) as is known in the art. The system 10 may be implemented in a fuel cell based electric vehicle 11 or a fuel cell based hybrid vehicle 11 or any other such apparatus that uses electrical current to drive various devices.

The system 10 has a fuel cell stack ("the stack") 12. The stack 12 includes multiple cells, with each cell 13 having an anode side 14, a cathode side 16, and a membrane 18 therebetween. Each cell may have an anode plate and a cathode plate with channels or other structures formed therein to control the flows of the anode and cathode gases. An example of an anode plate is illustrated below with reference to FIG. 3.

Only one fuel cell 13 of the fuel cell stack 12 is illustrated in FIG. 1, although the stack 12 contains any number of cells. The stack 12 electrically communicates with and provides energy, for example, to a high voltage bus 20 or a traction battery. The stack 12 generates stack current in response to electrochemically converting hydrogen and oxygen. The stack 12 may also have a cooling loop as described below with reference to FIG. 2.

Various electrical devices may be coupled to the battery 20 to consume such power in order to operate. If the system 10 is used in connection with a vehicle 11, the devices may include a motor or a plurality of vehicle electrical components that each consume power to function for a particular purpose. For example, such devices may be associated with and not limited to a vehicle powertrain, cabin heating and cooling, interior/exterior lighting, entertainment devices, and power locking windows. The particular types of devices implemented in the vehicle may vary based on vehicle content, the type of motor used, and the particular type of fuel cell stack implemented.

During operation of the fuel cell 10, product water, residual fuel such as hydrogen, and byproducts such as nitrogen, may accumulate at the anode side 14 of the fuel cell stack 12. Attempts have been made to remove the liquid product water and byproducts and to reuse the residual hydrogen and at least a portion of the water vapor. One approach is to collect those constituents in a purge assembly 36 downstream of the fuel cell stack 12, separate at least a portion of the liquid water, purge some of the liquid water and nitrogen, and return the remaining constituents to the fuel cell stack 12 via a return passageway in a recirculation loop 34.

A primary fuel source 22 is connected to the anode side 14 of the fuel cell stack 12, such as a primary hydrogen source, to provide a supply fuel stream (or an anode stream). Non-limiting examples of the primary hydrogen source 22 are a high-pressure hydrogen storage tank or a hydride storage device. For example, liquid hydrogen, hydrogen stored in various chemicals such as sodium borohydride or alanates, or hydrogen stored in metal hydrides may be used instead of compressed gas. A tank valve 23 controls the flow of the supply hydrogen. A pressure regulator 25 regulates the flow of the supply hydrogen.

The hydrogen source 22 is connected to one or more ejectors 24. The ejector may be a variable or multistage ejector or other suitable ejector. The ejector 24 is configured to combine the supply hydrogen (e.g., hydrogen received from the source 22) with unused hydrogen (e.g., recirculated from the fuel cell stack 12) to generate an input fuel stream. The ejector 24 controls the flow of the input fuel stream to the fuel cell stack 12. The ejector 24 has a nozzle 26 supplying hydrogen into the converging section of a converging-diverging nozzle 28. The diverging section of the nozzle 28 is connected to the input 30 of the anode side 14. In other examples, other devices may replace the ejector 24 to control the flow of hydrogen to the stack.

The output 32 of the anode side 14 is connected to a recirculation loop 34. The recirculation loop 34 may be a passive recirculation loop, as shown, or may be an active recirculation loop according to another embodiment. Typically, an excess of hydrogen gas is provided to the anode side 14 to ensure that there is sufficient hydrogen available to all of the cells in the stack 12. In other words, hydrogen is provided to the fuel cell stack 12 above a stoichiometric ratio of one, i.e. at a fuel rich ratio relative to exact electrochemical needs. The unused fuel stream, or recirculated fuel stream, at the anode output 32 may include various impurities such as nitrogen and water both in liquid and vapor form in addition to hydrogen. The recirculation loop 34 is provided such that excess hydrogen unused by the anode side 14 is returned to the input 30 so it may be used and not wasted.

Accumulated liquid and vapor phase water is an output of the anode side 14. The anode side 14 requires humidification for efficient chemical conversion and to extend membrane life. The recirculation loop 34 may be used to provide water to humidify the supply hydrogen gas before the input 30 of the anode side 14. Alternatively, a humidifier may be provided to add water vapor to the input fuel stream.

The recirculation loop 34 contains a purging assembly 36 to remove impurities or byproducts such as excess nitrogen, liquid water, and/or water vapor from the recirculation stream. The purging assembly 36 includes a water separator or knock-out device 38, a drain line 40 and a control valve 42, such as a purge valve. The separator 38 receives a stream or fluid mixture of hydrogen gas, nitrogen gas, and water from the output 32 of the anode side 14. The water may be mixed phase and contain both liquid and vapor phase water. The separator 38 removes at least a portion of the liquid phase water, which exits the separator through drain line 40. At least a portion of the nitrogen gas, hydrogen gas, and vapor phase water may also exit the drain line 40, and pass through a control valve 42, for example, during a purge process of the fuel cell stack 12. The control valve 42 may be a solenoid valve or other suitable valve. The remainder of the fluid in the separator 38 exits through passageway 44 in the recirculation loop 34, which is connected to the ejector 24 as shown herein, or an active recirculation device. The stream in passageway 44 may contain a substantial amount of hydrogen compared to the outlet 32. The fluid in passageway 44 is fed into the converging section of the converging-diverging nozzle 28 where it mixes with incoming hydrogen from the nozzle 26 and from the hydrogen source 22.

Liquid water may be removed from the anode side 14 by the purge assembly 36 to prevent water blockages within the channels and cells of the anode side 14. Water blockages within the fuel cell stack 12 may lead to decreases in cell voltage and/or voltage instabilities within the fuel cell stack 12. Liquid water may also be removed by the separator 38 to prevent a blockage or partial blockage within the ejector 24. The separator 38, valve 42, and/or ejector 24 may be provided with a heater, such as a resistive heating element, Peltier heater, or the like to prevent ice formation or blockages or reduce ice formations within the recirculation loop 34 and allow for the fuel cell stack 12 to be purged of excess water and/or nitrogen even in freezing conditions.

The cathode side 16 of the stack 12 receives oxygen in a cathode stream, for example, as a constituent in an air source 46 such as atmospheric air. In one embodiment, a compressor 48 is driven by a motor 50 to pressurize the incoming air. The pressurized air, or cathode stream, may be humidified by a humidifier 52 before entering the cathode side 16 at inlet 54. The water may be needed to ensure that membranes (not shown) in the fuel cell stack 12 remain humidified to provide for optimal operation of the fuel cell stack 12. The output 56 of the cathode side 16 is configured to discharge excess air and is connected to a valve 58. Drain line 60 from the purging assembly 36, may be connected to an outlet 62 downstream of the valve 58. In other embodiments, the drain lines may be plumbed to other locations in the fuel cell system 10.

The stack 12 may be cooled using a coolant loop 64, and is described in further detail with respect to FIG. 2 below. The coolant loop 64 has an inlet 66 and an outlet 68 to the stack 12 to cool the stack during operation of the fuel cell. The coolant loop 64 may have a temperature sensor 70 to determine the coolant temperature. The coolant temperature sensor 70 is positioned outside of the fuel cell stack 12, and may be adjacent to and downstream of the stack as shown, or may be connected in other locations in the fuel cell system.

The stack 12 may also have a humidity sensor 72 positioned at the inlet 54 to the cathode side 16 of the stack 12. The sensor 72 may also include a temperature sensing module.

A controller 74 receives signals from the sensors 70, 72, and other sensors that may be associated with the fuel cell system 10 and coolant system 64. The controller 74 may be a single controller or multiple controllers or modules in communication with one another. The controller 74 is also in communication with the valve 23, regulator 25, and motor 50. The controller 74 may be integrated into a vehicle control system, and be connected to a random access memory or other data storage system. The controller 74 may be in communication with other vehicle sensors, such as an outside air temperature sensor 76.

During operation, the stoichiometric ratio of total reactant per reactant electrochemically needed for both reactants, of the fuel cell system 10 may be controlled based on the fuel cell operating state, environmental conditions, and the like. The stoichiometry may be controlled using the valve 23 and regulator 25 on the anode side 14 to control the flow rate of fuel, or hydrogen to the stack 12, and using the compressor 48 and motor 50 on the cathode side 16 to control the flow rate of air to the stack 12. The system 10 may be operated through a range of fuel and air stoichiometries, above stoichiometric ratios of one. As the system 10 is operated at a lower power level, the amount of water byproduct will decrease, as the amount of current drawn from the stack 12 decreases.

For example, during a purge process while the system is operating, excess nitrogen and/or excess water is removed from the anode side 14 of the fuel cell. When the concentration or partial pressure of nitrogen in the anode side 14 of the fuel cell is too high, the performance of the fuel cell 10 decreases as there is an insufficient concentration of hydrogen, or the partial pressure of hydrogen is too low. By purging the anode side 14 of the fuel cell, the excess nitrogen is flushed out of the anode side 14 of the stack 12. The mixture of hydrogen, excess nitrogen, and liquid and vapor phase water enters the separator 38 during the purge process. The valve 42 is opened and causes liquid water, excess nitrogen, and a portion of the hydrogen to exit the drain line 40 of the separator 38.

After a vehicle 11 shut-down request or command, e.g. a key cycle event when the key is removed from the ignition, or a fuel cell system 10 shut-down command, the fuel cell system ceases to operate. The fuel cell system operates with the stack at an operating temperature, which may be in the range of 50-90 degrees Celsius. When the fuel cell system is shut down, the coolant system 64 is also shut down with the pump stopped as long as the stack 12 and coolant temperature are within acceptable temperature ranges.

After shutdown, the fuel cell stack 12 cools, and the temperature of the fuel cell stack varies as a function of location within the fuel cell stack, with the outer edge regions 82 being cooler than the central region 80. As the stack cools, water vapor in the anode and/or cathode passages and channels cools, and will condense into liquid. When the fuel cell system 10 and vehicle 11 are located in a cold ambient environment, this liquid may freeze and form ice, especially in narrow passages and channels such as the vias, and may prevent the later purge process or cause issues when restarting the fuel cell system and vehicle in subsequent key-on event.

In conventional fuel cell system operation and preparation for a startup in freezing conditions, during the preceding shutdown the system will try to evaporate and remove some water at warm temperatures by flowing dry purging gases through the anodes and cathodes. During the subsequent cold soak and cool down of the stack some water vapor may condense and reside in areas where it becomes deleterious if it freezes. For example, one or more fuel cells in the fuel cell stack may go into reversal, e.g. cell voltage of around −1 Volts or lower, during system startup in freezing conditions if ice blockages are present in the stack preventing the normal flow of gases therethrough. For example, the cell voltage reversals may be due to a lack of sufficient hydrogen at the anode catalyst, the prevention of hydrogen from reaching the catalyst, and/or the prevention of the removal of waste materials (nitrogen, argon, water vapor) from the cell.

After the fuel cell system 10 is shut down, and before the purge process is commanded, the fuel cell stack 12 begins to cool as described above. The purge process referred to here is a fuel cell stack purge event occurring after the fuel cell system shut down, e.g. vehicle key off, and during cold soak when the fuel cell system is in a non-operating state. As the cooling system 64 is inoperative for a time period, for example, to increase energy efficiency of the system, the fuel cell stack 12 cools passively, e.g. via conductive and radiative heat transfer, and undergoes a transient thermal state with non-uniform temperatures across the fuel cell stack 12. The temperature in the stack 12 prior to the stack purge event is likely to be non-uniform, where the central region 80 of the stack being warmer than the outer edges 82 or extremities of the stack (as shown in FIGS. 2-3). As a result of this non-uniform distribution of temperature and desire to maximize condensation by delaying the stack purge, vias and channels in the outer edge regions 82 of the stack 12 may be at or near freezing temperatures and ice blockages may form before the stack purge is conducted. For example, ice may form and at least partially block the anode outlet pathway of the cells, otherwise known as the vias. Likewise, the anode inlets, or inlet vias, may also have ice formation or blockages therein at low temperatures. The anode outlet vias are typically one of the colder areas of the fuel cell stack since it is located away from the central region and thermal mass of the stack. Furthermore, as the vias have small dimensions and corresponding small volumes or liquid water contained therein, they may tend to freeze first compared to larger water volumes.

The fuel cell system 10 according to the present disclosure allows for the fuel cell stack 12 to cool after shutdown to allow for water condensation in the stack 12 with the liquid water in its final resting position. When the stack 12 has cooled to a sufficient degree, and the outside ambient temperature indicates a freezing risk, the controller 74 may operate the cooling system 64 to melt any ice formations in the outer edge regions 82 of the stack, provide a more uniform stack temperature with additional condensation, and then command a purge process to clear any liquid water in the flow passages to avoid ice blockages forming during a cold soak.

The fuel cell system 10 according to the present disclosure uses the warmer coolant within the central region 80 of the fuel cell stack 12, and the residual heat in that coolant, to unfreeze any ice blockages in the anode outlet vias before conducting the stack purge. The stack purge can then be delayed to allow for additional condensation while preventing frozen vias or channels during the purge or during a later fuel cell start up procedure.

The warm coolant in the central region 80 of the stack is circulated through coolant passages adjacent to the vias for a suitable time for any ice to melt in the vias prior to conducting the stack purge to clear the vias of water before the entire system goes below freezing. The controller 74 may use sensor data or correlations, for example, from calibration tables, to control the system 10. The controller 74 determines when the anode vias reach a temperature such that liquid water may freeze in them relative to other temperature measurements in the system, and this may be determined using a coolant temperature measurement adjacent to the anode outlet of the stack. The controller 74 determines where the warmest coolant located when the vias reach a freezing level, for example, in a central region of the stack. The controller 74 also determines the length of time and the amount of pump energy or speed needed to flow the coolant such that the warmest coolant in the system is adjacent to or flowing past the anode outlet vias and melt any ice formed therein.

By melting and preventing ice blockages within the stack 12, the fuel cell stack may be purged of excess water even in freezing conditions, thereby avoiding ill effects from ice blockages during a subsequent startup of the fuel cell system.

Figure 2:
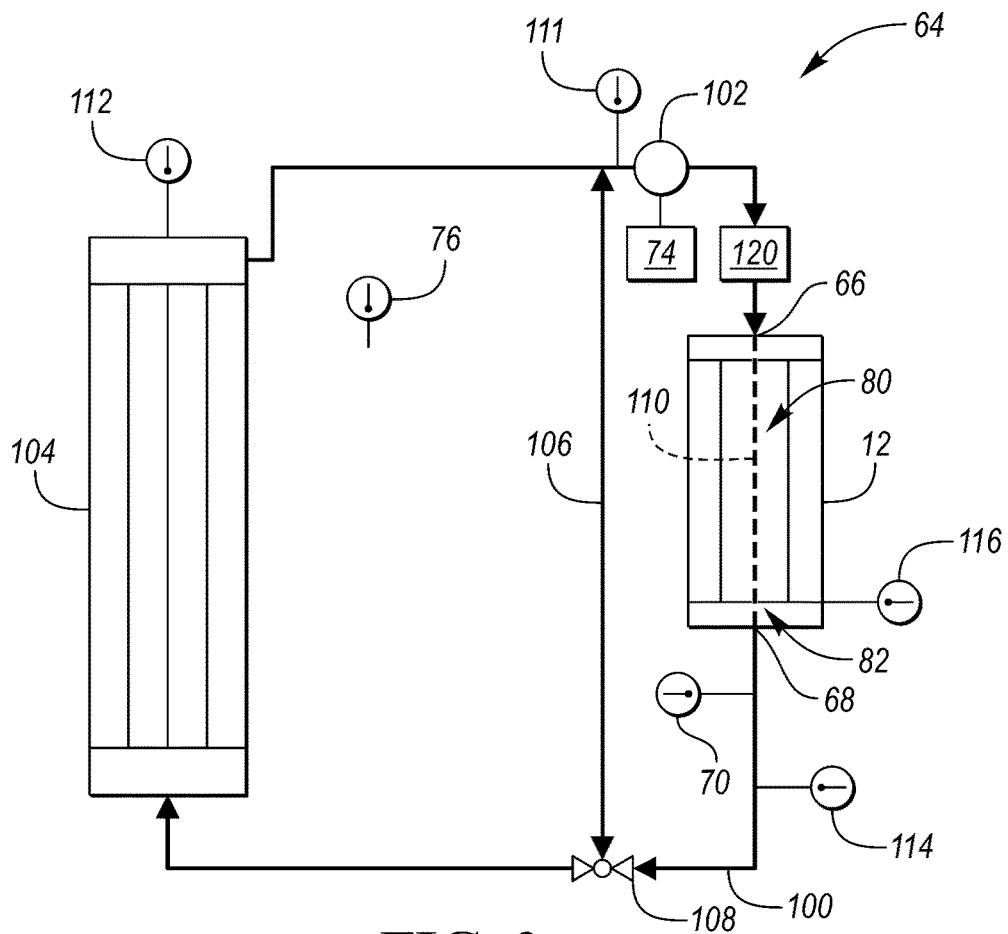
FIG. 2 illustrates a schematic of a coolant system for use with the fuel cell system of FIG. 1.
Figure 3:
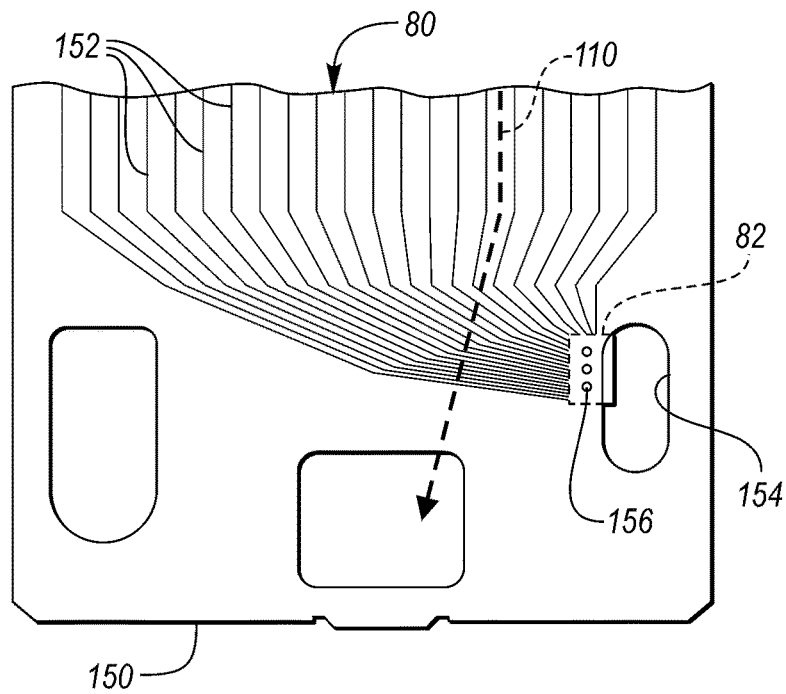
FIG. 3 illustrates a partial perspective view of a fuel cell plate according to an embodiment for use with the fuel cell system of FIG. 1.

FIG. 2 illustrates a schematic of a coolant system 64 for use with the fuel cell system 10 and vehicle 11 of claim 1. The coolant system 64 is configured to provide coolant flow through the fuel cell stack 12 to control a temperature of the stack. In other embodiments, the coolant system 64 may provide cooling and/or heating for other vehicle systems such as electronics systems including the motor and battery, and other components or systems such as a passenger compartment HVAC system, and other vehicle system heat exchangers. Elements that are the same as or similar to those shown in FIG. 1 are given the same reference number.

The coolant system 64 has a fluid circuit 100 that contains a coolant. In one example, the coolant is a glycol-based coolant, or other coolant as is known in the art. The coolant is provided with a freezing temperature below that of water to prevent the coolant in the system from freezing at low ambient temperatures. The system 64 may have various components such as filters, degas lines, and sumps or reservoirs.

The coolant system 64 has a pump 102 that circulates coolant in the fluid circuit 100. The pump 102 may be electrically driven, and may be electrically connected to the battery and to the controller 74. In other examples, the system 64 may have more than one pump to circulate coolant in the system. The controller 74 may control the on/off state of the pump 102 as well as the speed of the pump, thereby controlling the flow rate of the coolant. The fluid circuit 100 has a radiator 104 or other heat exchanger. The radiator 104 may be used to reduce the temperature of the coolant via heat transfer with another medium. In one example, the radiator 104 is configured to exchange heat between the coolant and air in the ambient, outside environment. In another example, the radiator 104 may be configured to exchange heat between the coolant and another vehicle system fluid. In further examples, the radiator 104 may be provided by two or more heat exchangers arranged in various configurations for heat exchange between the coolant and two or more associated fluids.

The fluid circuit 100 has a radiator bypass passage 106 and a valve assembly 108. The controller 74 is configured to control operation of the valve assembly 108 to control coolant flow between the radiator 104 and the bypass passage 106. In one example, the valve assembly 108 is controlled such that all of the coolant is directed from the inlet port of the valve to the radiator, or all of the coolant is directed from the inlet port of the valve to the bypass passage. In further examples, the controller 74 may control a position of the valve 108 to direct a portion of the coolant through the bypass passage, and the remainder of the coolant through the radiator.

The fluid circuit 100 also has a coolant passage 110 that passes through the fuel cell stack 12, and is configured to exchange heat between the fuel cell stack 12 and the coolant. During operation of the fuel cell, the coolant system 64 is operated and controlled to remove heat from the fuel cell stack 12 and control the temperature of the fuel cell stack. The coolant passage 110 may be provided as a single passage through the stack, or may be provided as a series of passages in the fuel cell stack, with passages associated with various cells in the stack. At least one of the coolant passages 110 enters the stack along an edge region 82 of the stack, passes through a central region 80 of the stack, and then exits the stack along an edge region 82 of the stack.

The coolant system 64 may be provided with various sensors that are in communication with the controller 74 to improve control of the coolant system, and efficient control over the temperature of the fuel cell stack 12. In one example, the system 64 has one or more of the following sensors: a stack coolant inlet temperature sensor 111, a stack coolant outlet temperature sensor 70, a radiator coolant temperature sensor 112, a coolant flow rate sensor 114 through the stack, and one or more temperature sensors 116 within the fuel cell stack that may be positioned near the anode outlet and in contact with coolant or reactive gases, at a central region of the stack, and at other locations for temperature monitoring and thermal control. The controller 74 may additionally use an ambient temperature sensor 76 as described above with respect to FIG. 1.

FIG. 3 illustrates a partial perspective view of a plate 150 for a fuel cell 10. In one example, the plate 150 is used on an anode side of a cell 13 in the stack. Each plate 150 may be formed from a metal or a metal alloy with high thermal conductivity and high heat transfer efficiency with the coolant passing by. In other examples, the plates may be formed from another material such as carbon fiber or a composite with high enough thermal conductivity to facilitate this heat transfer pathway.

The plate 150 has a series of channels 152 formed therein to provide flow passages for anode gases during operation of the fuel cell. These anode gases flow towards the anode outlet 154, 32. The anode gases may flow through vias 156 when exiting the channels 152 and flowing into the outlet 154. Multiple plates 150 are stacked when the fuel cell stack is assembled such that the outlet ports 154 form a header with a tunnel-like header passage.

The channels 152 may be provided with relatively small sizes, for example, on the order of around one millimeters in width and depth. The vias 156 may be on the same order of size magnitude as the channels, and in further examples, may be smaller than the channels such that they are on the order of around one millimeters in width and depth.

As the vias 156 and channels 152 have small physical sizes, any water in the vias or channels may freeze and form ice when the temperature of the plate 150 and surrounding cell 13 reaches low temperatures. Based on the small sizes of the vias and the channels, it may be easy for small droplets of liquid water to completely or partially block a via or channel once frozen.

Additionally, when the fuel cell system 10 is shut down and begins the transient cooling process, the vias 156 reach a cooler temperature at a faster rate than other, more central regions 80 of the fuel cell system as the vias are located adjacent to the anode outlet 154 and along an outer edge region 82 of the fuel cell stack. As the temperature at the vias 156 drops, humidity in anode gases may condense as water droplets onto the walls of the vias or adjacent channels, and if the temperature continues to drop, may freeze onto these surfaces.

The coolant system 64 has at least one passage 110 or flow conduit that passes through the fuel cell stack 12. In one example, the coolant passage 110 extends through a central region 80 of the cell and a central region of the stack, and also extends adjacent to vias of an anode outlet 154 for a cell in the fuel cell stack. An example of a coolant passage 110 is illustrated in broken lines in FIG. 3, and may be provided on an opposite side of the plate 150, or at least partially integrated into the plate as shown.

Figure 4:
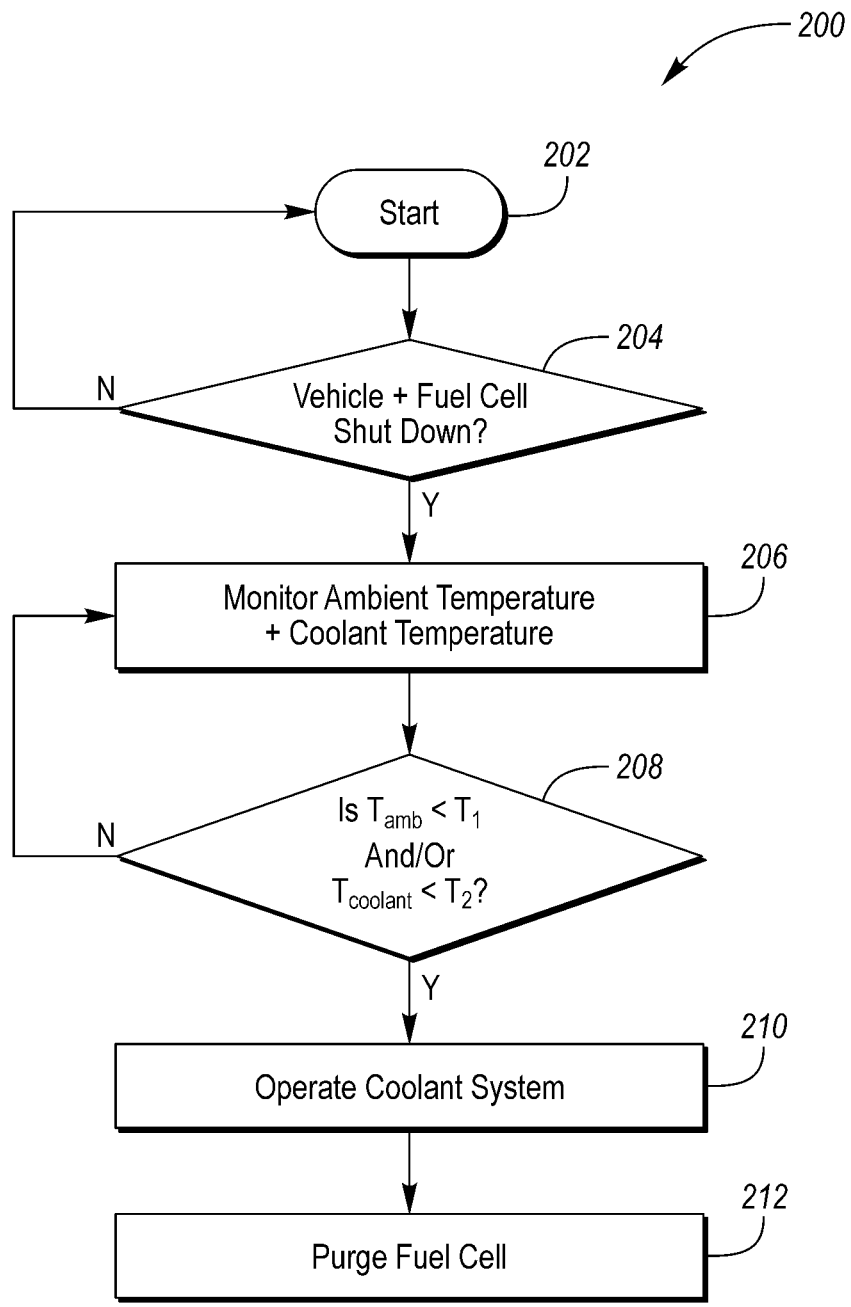
FIG. 4 illustrates a flow chart for a method of controlling a fuel cell in a vehicle according to an embodiment.

FIG. 4 illustrates a flow chart of a method 200 for use with a fuel cell system 10 and a coolant system 64 according to an embodiment of the present disclosure. In other embodiments, various steps in the method may be combined, rearranged, or omitted. In one embodiment, the method is used by the control system of the vehicle 11.

The method begins at 202 and proceeds to step 204. At step 204, the controller 74 determines if a vehicle 11 shut down command, fuel cell 10 shut down command, or key-off event has occurred. If a vehicle shut down command has been received, the controller 74 may go into a standby or sleep mode after commanding various initial fuel cell shut down procedures. The coolant system 64 is likewise shut down such that the pump does not operate, and the coolant flow rate through the stack and circuit is at zero. The fuel cell system 10 begins a cold soak process as it is also shut down.

At step 206, the controller 74 may initiate a timer, or periodically wake up to monitor the ambient temperature. The controller 74 monitors the fuel cell system 10 after shut down, and the system may have an on-board monitor or diagnostic that periodically is scheduled to run and check the ambient temperature and fuel cell stack 12 temperature. The monitor may include a time delay and be scheduled for a time period after fuel cell system 10 shut down to allow the stack 12 to cool some from its operating temperature. The time delay may be based on the temperature of the fuel cell at shut down as well as the ambient temperature. For example, the fuel cell system 10 may rest for a time period on the order of minutes or hours before it has cooled sufficiently for the remainder of the method to proceed.

When the controller 74 is monitoring the ambient temperature, it may also monitor the coolant temperature at various locations in the coolant system 64. In one example, the controller 74 may directly measure the ambient temperature using the ambient temperature sensor 76. In other examples, the controller 74 may monitor the coolant temperature at the outlet of the fuel cell stack at 70, or at another location in the coolant system away from the fuel cell stack, and infer or correlate an ambient temperature based on the coolant temperature at this location.

At step 208, the controller 74 determines that the ambient temperature is below a threshold value $T_1$. In one example, the threshold value $T_1$ is five degrees Celsius; however, the threshold value $T_1$ may be other temperature values, or may be based on a predictive value for a temperature during the cold soak. In other embodiments, the threshold value $T_1$ may be above or below the freezing level, or at zero Celsius.

At step 208, the controller 74 determines if the coolant temperature at a location outside of the fuel cell stack, for example at sensor 70, is below a secondary temperature value $T_2$. The secondary temperature value $T_2$ may be five degrees Celsius, or may be a higher or lower temperature value. In one example, the secondary temperature value $T_2$ may be one or two degrees Celsius higher than the threshold value $T_1$. In one example, the controller 74 uses a temperature sensor 70, such as a coolant temperature sensor in the coolant system downstream of the stack, to determine the coolant temperature away from and outside of the stack 12.

In one example, the controller 74 may only determine the ambient temperature using a coolant temperature measurement and a correlation between the coolant temperature and the length of time since the vehicle shut down to determine an approximate ambient temperature.

The controller 74 may additionally measure or estimate the temperature of the coolant in a central region 80 of the stack 12. In a further example, the controller proceeds from step 208 to step 210 below when the temperature of the coolant outside of the stack is below a lower temperature value $T_2$, and when the temperature difference between the coolant in the central region 80 of the stack and the coolant outside of the stack is above a predetermined temperature difference, which represents sufficient heat retained by the coolant in the central region 80 to melt any ice formations in the vias 156 and also indicates that the stack 12 has sufficiently cooled such that a large portion of the water vapor has condensed as liquid in the stack 12. In one example, the coolant temperature difference at step 208 is at 30-50 degrees Celsius, and the coolant temperature difference after step 210 as described below and prior to purge is at approximately 10 degrees Celsius, indicating that the central region 80 or core of the fuel cell stack has significantly cooled.

At step 210, the controller 74 commands the coolant system 64 to operate such that coolant is circulated through the fuel cell stack 12. Step 210 is performed in response to a signal indicative of an ambient temperature being below a threshold value after a vehicle shut down command. Step 210 is performed or started prior to commanding a purge of the fuel cell stack and may overlap the purge process. By circulating coolant with a non-uniform temperature through the stack 12, the warmer coolant in the central region 80 may be used to heat the stack 12 along the outer edges regions 82 and melt any ice formations in the vias 156 or adjacent passages. Furthermore, by circulating coolant, the stack 12 temperature becomes more uniform, and water vapor in the central region 80 of the stack may condense such that the stack 12 humidity may be reduced.

The controller 74 operates the pump 102 in the coolant system while coolant in the fuel cell stack 12 has a non-uniform temperature to circulate coolant through the stack and reduce ice formation in the stack prior to purging the fuel cell stack with gases. After vehicle 11 shut down, and prior to circulating the coolant, the coolant of the coolant system 64 in a central region 80 of the stack is at a higher temperature than coolant in an edge region 82 of the stack. When coolant is circulated, the temperature of the edge region 82 of the stack increases such that any ice formed within the vias 156 is melted.

In one example, the controller 74 controls the coolant system 64 to continuously circulate coolant through the fuel cell stack 12. The controller may control the valve 108 of the coolant system such that coolant flows from the stack 12, through the bypass passage 106, and back to the stack 12. The warm coolant in the central region 80 of the fuel cell stack flows past the vias 156 and mixes with the remainder of the coolant in the system 64. Over time, any ice formed in the vias 156 or other channels in the stack 12 is melted. The coolant may be circulated continuously for a predetermined time period, for example on the order of minutes. In one example, the coolant is continuously circulated for one to ten minutes, and in a further example, is circulated for two to five minutes. Alternatively, the coolant is continuously circulated by the pump until the coolant reaches a steady state temperature.

In another example, the controller 74 controls the coolant system 64 to pulse the flow of the coolant in the coolant system. In one example, the controller 74 controls the pump 102 or electric machine controlling the pump rotation such that the coolant in the channels 152 in the central region 80 of the stack is pulsed and moved a discrete distance forward, sits in a stagnant position for a period of time, and repeats as controlled through a series of pulses and intervening pauses by the controller. The length of each pulse and associated movement of coolant within the stack 12, as well as the length of time of each pause may be controlled by the controller. The controller 74 may control the valve 108 such that the coolant flows through the bypass passage 106, and controls a pump 102 or an electric machine or stepper motor for the pump to pulse the coolant flow through a series of on and off periods, for example five seconds running and one minute off and resting, or the like. The coolant is therefore moved towards the stack outlet 68 and the off periods allow some latency time for thawing ice.

While circulating coolant, the controller 74 may control the valve 108 to control the coolant flow through the bypass passage 106, the radiator 104, or a combination thereof. Using the valve 108, the controller 74 can further control the temperature of the coolant flowing into the stack 12, as the radiator 104 contains a larger volume of coolant at a low temperature. In another example, while continuously circulating coolant through the stack, the controller 74 may control the valve 108 position to blend coolant from the radiator into the coolant circulating in the bypass passage 106 and further control and reduce the temperature of the circulating coolant through the stack 12. This allows the fuel cell stack 12 temperature to be reduced to a lower average temperature than could occur simply by circulating the coolant through the bypass passage 106 and stack 12. A longer period of coolant flow may be used and coolant from the larger radiator 104 loop may be blended in to slowly using the valve 108 to reduce the average temperature in the fuel cell stack, while maintaining the temperature near the outlet vias 156 above freezing. For example, the coolant flow continues for longer than a few minutes and the coolant outlet temperature is monitored for a lower bound temperature $T_3$ above zero degrees Celsius, e.g. 1-5 degrees Celsius. As the ambient temperature may be below freezing and the coolant may be at a higher temperature than the vias 156 based on inefficiencies in the heat transfer process, the stack purge at step 212 is initiated at a coolant outlet temperature several degrees Celsius above zero to prevent any water in the vias from refreezing into ice.

In another example at step 210, when the coolant in the central region 80 of the stack has insufficient heat or thermal mass, when the coolant outside of the stack 12 is below zero Celsius, or when the valve 108 is inoperative, the controller 74 may control a heater 120 positioned within the coolant system 64 to heat coolant while circulating the coolant through the stack 12. In one example, the heater 120 may be an electrical heater, such as a resistive heating element, a positive temperature coefficient heater or a Peltier heater. The heater 120 may be required in certain stack configurations, such as when the coolant flows in the opposite direction to the anode flow, in a counterflow heat exchanger arrangement.

At step 212, the controller commands a purge of the fuel cell stack 12. In one example, the controller 74 commands one or more compressors to operate to cause pressurized gases to flow through the fuel cell stack 12 on the anode and/or cathode sides to cause liquid water, as well as excess nitrogen or other gases to exit the stack. By purging the system of excess liquid water, even if some residual moisture remains in the stack and the stack reaches freezing levels, the channels 152 and the vias 156 will remain free of ice blockages and allow for ready start-up of the system.

The controller 74 is configured to operate the compressor or control fuel cell values after vehicle shut down and at step 212 above to provide pressurized gases through the stack when commanding the purge of the fuel cell stack 12 to remove liquid water from the stack. In some examples, the controller 74 is configured to continue to circulate coolant in the stack 12 while operating the compressor and conducting the purge to prevent ice formation during the purge process and continue to remove any condensing liquid. The controller 74 may operate the motor of the compressor on the cathode side of the fuel cell stack to provide pressurized air to blow out the cathode side of the stack.

In one example, the controller 74 has operated the valve 108 to blend in coolant from the radiator 104 with coolant in the stack 12 and bypass passage 106 to further reduce the temperature of the fuel cell stack 12. By cooling the fuel cell stack 12 to a temperature just above a freezing level, e.g. one to two degrees Celsius, additional water vapor in the stack 12 is condensed and the purge process is able to remove additional liquid water from the stack. The controller 74 may command the purge when using the valve 108 to control the coolant temperature in response to the coolant temperature reaching a lower threshold value, for example, one to two degrees Celsius.

Figure 5:
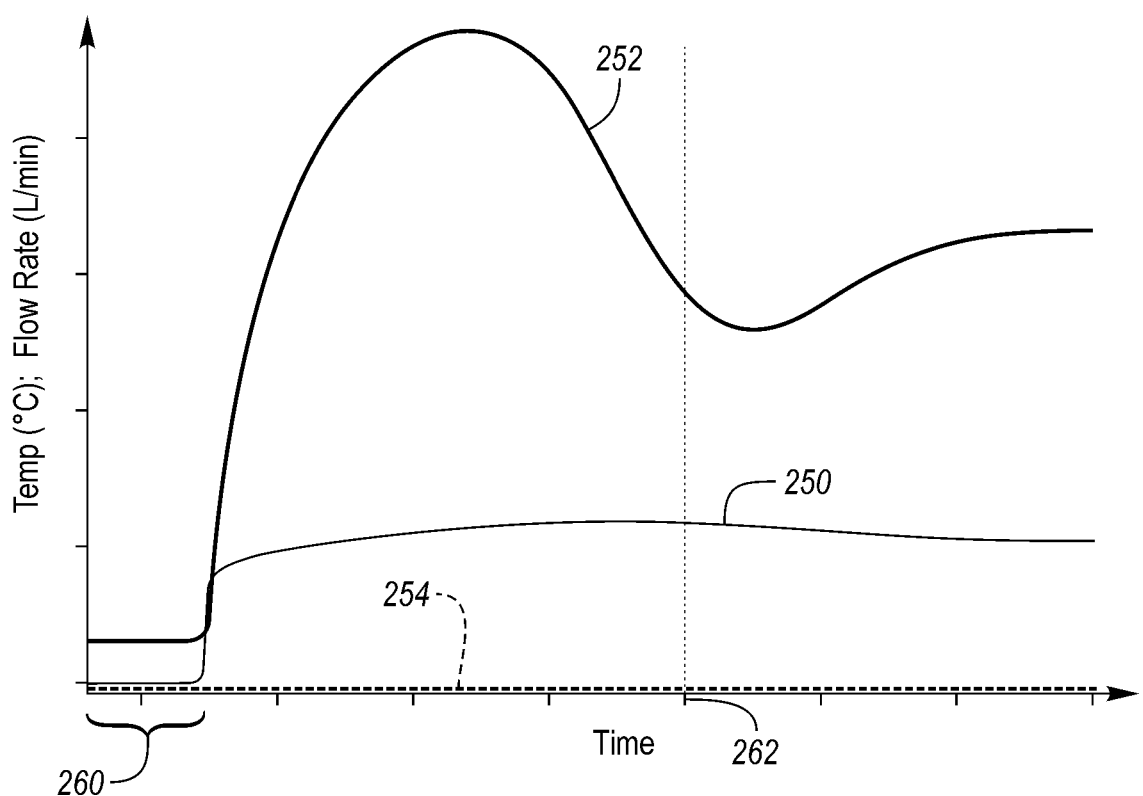
FIG. 5 illustrates a graph of fuel cell system and coolant system parameters as resulting from the method of FIG. 4.

FIG. 5 illustrates an example of a fuel cell system 10 during a cold soak, including coolant circulation prior to purge, according to the present disclosure. The graph illustrates coolant flow rate through the stack as line 250, the temperature of the coolant immediately downstream of the anode outlet as line 252, and the temperature of the fuel cell stack near the anode outlet and at an outer edge region of the stack as line 254. The ambient temperature in the present example, is below zero degrees Celsius.

Prior to time 260, the fuel cell system 10 is in a cold soak state after the vehicle 11 is shut down, the coolant and any reactant gases are not flowing. The coolant just outside the stack 12 is a few degrees Celsius about freezing, and the temperature measured near the anode outlet in the anode gas volume is measuring at or below zero Celsius. Since the system 10 has been slowly soaking in a cold ambient, and no coolant or reactants are flowing, the average temperature of the anode outlet vias may be approximated as the same temperature as line 254, and therefore any vias containing water are likely frozen.

At time 260, the controller 74 commands the coolant system 64 to circulate coolant through the stack 12 with the valve 108 directing all of the recirculating coolant through the bypass passage. The coolant temperature at the stack outlet immediately begins to increase, as shown by line 252, as the coolant is flowing and warm coolant from the stack 12 flows past the sensor. Note that the fuel cell stack temperature sensor does not indicate a temperature increase as heat transfer from the fuel cell plate and adjacent coolant to the gas volume in the anode outlet header the stack temperature sensor is located is low. Therefore the fuel cell stack temperature sensor at line 254 no longer represents the temperature of the vias 156.

The vias 156 temperature is affected by the temperature of its plate 150 and the circulating coolant. The heat from the core or central region 80 of the stack is being distributed throughout the entire coolant loop and across each cell and coolant plate. As the coolant circulates, the temperature throughout the coolant loop becomes more uniform and the coolant temperature and stack plates become more isothermal. This is noted by a small decrease in coolant temperature at the stack outlet, for example, from a peak of 40-50 degrees Celsius to a more stable temperature around 20-30 degrees Celsius at time 262. After the coolant begins to flow, heat is transferred from the coolant into the plate 150 and to the plate vias 156 to melt any ice formed therein.

While various embodiments are described above, it is not intended that these embodiments describe all possible forms of the disclosure. Rather, the words used in the specification are words of description rather than limitation, and it is understood that various changes may be made without departing from the spirit and scope of the invention. Additionally, the features of various implementing embodiments may be combined to form further embodiments of the disclosure.

What is claimed is:

1. A method of controlling a vehicle fuel cell system comprising:
   responsive to a vehicle shutdown event, shutting down a coolant system via a controller such that a pump does not operate and a coolant flow rate through a fuel cell stack is zero with coolant present in a central region of the fuel cell stack and outside the central region in the fuel cell stack;
   after the vehicle shutdown event and while the pump is inoperative, monitoring an ambient temperature outside the fuel cell stack and a coolant temperature outside the central region; and
   after a time delay following the vehicle shutdown event during which the pump is inoperative and coolant in the central region is warmer than coolant outside of the central region, and in response to the ambient temperature and the coolant temperature outside the central region being below respective threshold values, operating the pump to circulate coolant from the central region through the fuel cell stack such that ice formation is reduced in the fuel cell stack prior to purging the fuel cell stack with gases.

2. The method of claim 1 wherein the threshold value corresponds to five degrees Celsius or less.

3. The method of claim 1 wherein, after the vehicle shut down event and prior to circulating coolant, the coolant of the coolant system in the central region of the fuel cell stack is at a higher temperature than coolant in an edge region of the stack, the edge region having vias of an anode outlet for a cell in the fuel cell stack; and
   wherein the coolant is circulated in the coolant system and through the fuel cell stack to increase a temperature of the edge region and the vias.

4. The method of claim 1 wherein the coolant is circulated through the fuel cell stack continuously for a predetermined time period after the coolant temperature outside of the fuel cell stack reaches a secondary threshold value and prior to purging.

5. The method of claim 1 wherein the coolant is circulated through the fuel cell stack by commanding a series of pulses of coolant flow in the coolant system after the coolant temperature outside of the fuel cell stack reaches a secondary threshold value and prior to purging.

6. The method of claim 1 further comprising: controlling a valve configured to control flow between a radiator and a radiator bypass passage in the coolant system, wherein the valve is controlled to direct the coolant flow through the bypass passage while circulating the coolant flow through the fuel cell stack.

7. The method of claim 1 further comprising: controlling a valve configured to control flow between a radiator and a radiator bypass passage in the coolant system, wherein the valve is controlled to blend the coolant flows from the radiator and the bypass passage to control coolant temperature and reduce an average temperature of the fuel cell stack while circulating the coolant flow through the fuel cell stack;
   wherein purging is in response to the coolant temperature reaching a secondary threshold value.

8. A method of controlling a vehicle fuel cell system comprising:
   shutting down a coolant system such that a pump is inoperative and a coolant flow rate through a fuel cell stack is zero with coolant present in both a central region of the fuel cell stack and outside the central region of the fuel cell stack; and
   after the shutting down and responsive to a coolant temperature outside the central region and an ambient temperature outside the fuel cell stack each being less than a threshold temperature, operating the pump to circulate coolant from the central region through the fuel cell stack prior to purging the fuel cell stack with gas.

9. The method of claim 8, wherein after the shutting down operating the pump, the coolant of the coolant system in the central region of the fuel cell stack is at a higher temperature than coolant in an edge region of the stack, the edge region having vias of an anode outlet for a cell in the fuel cell stack; and
   wherein the coolant is circulated in the coolant system and through the fuel cell stack to increase a temperature of the edge region and the vias.

10. The method of claim 8 further comprising:
    controlling a valve configured to control flow between a radiator and a radiator bypass passage in the coolant system, wherein the valve is controlled to direct the coolant flow through the bypass passage while circulating the coolant flow through the stack.

11. The method of claim 8 further comprising:
    controlling a valve configured to control flow between a radiator and a radiator bypass passage in the coolant system, wherein the valve is controlled to blend coolant flows from the radiator and the bypass passage to control coolant temperature and reduce an average temperature of the fuel cell stack while circulating the coolant flow through the stack;
    wherein purging is in response to the coolant temperature reaching a secondary threshold value.

\* \* \* \* \*